United States Patent [19]

Lorch et al.

[11] 4,051,376

[45] Sept. 27, 1977

[54] IONIZATION DETECTORS

[75] Inventors: Edgar Adolf Lorch; David John Dwight, both of Amersham, England

[73] Assignee: The Radiochemical Centre Ltd., England

[21] Appl. No.: 652,579

[22] Filed: Jan. 26, 1976

[30] Foreign Application Priority Data

Jan. 28, 1975 United Kingdom ................ 3742/75

[51] Int. Cl.[2] ......................... G01T 1/18; H01J 17/32

[52] U.S. Cl. ...................................... 250/381; 313/54

[58] Field of Search ........................... 250/381; 313/54

[56] References Cited

U.S. PATENT DOCUMENTS

| | | | |
|---|---|---|---|
| 3,602,716 | 8/1971 | Matousek et al. | 250/381 |
| 3,714,421 | 1/1973 | Josias et al. | 250/381 |
| 3,735,138 | 5/1973 | Rork | 250/381 X |

*Primary Examiner*—Archie R. Borchelt

*Attorney, Agent, or Firm*—Wenderoth, Lind & Ponack

[57] ABSTRACT

A novel form of ionization detector, particularly one operating in the electron capture mode, is described. The detector includes iron-55 as a source of electrons to cause ionization. The detector may be operated in direct current, pulse or frequency modulated modes.

5 Claims, 1 Drawing Figure

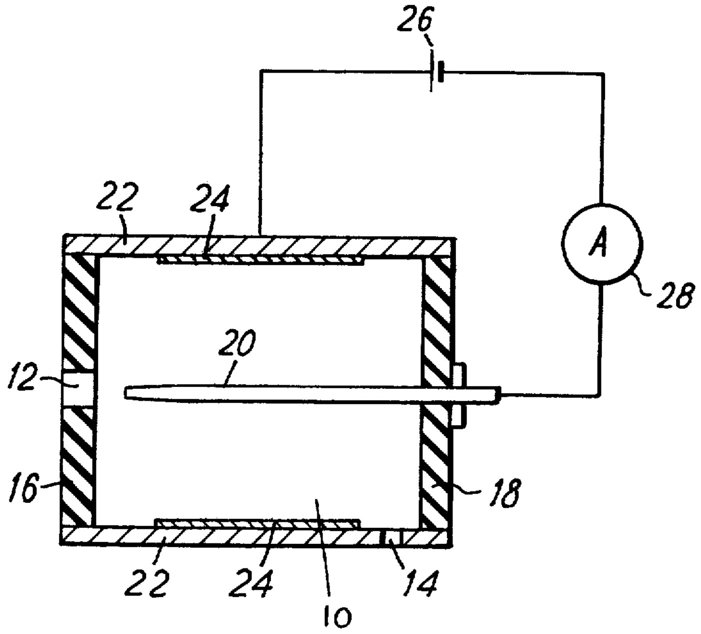
26
22
24
A
28
20
12
16
18
22
24
14
10

IONIZATION DETECTORS

The present invention concerns ionisation detectors. It includes but is not limited to electron capture detectors.

An electron capture detector is an ionisation cell having a pair of electrodes, an internal source of ionising radiation, and provision for the passing of gas between the electrodes. Carrier gas on flowing through the detector is ionised by radiation from the source. By applying a voltage across the electrodes the free electrons are collected at the anode, providing an effectively constant standing current. If a trace of material containing molecules which are electron absorbing is introduced into the carrier gas some free electrons will be captured as these molecules enter the detector. The reduction in the number of free electrons is reflected in the fall observed in standing current.

The radioactive source used in electron capture detectors should emit radiation which causes ionisation sufficient to allow conveniently measurable currents to pass, say in the region 0.05 to 10 nanoamps. Conventional sources use beta-emitting nuclides, usually tritium or nickel-63. The radiation from tritium is of low maximum energy (18 keV) compared to that from nickel-63 (67 keV). The lower energy radiation from tritium is advantageous because its shorter path length in gas allows a smaller separation between the electrodes and hence a lower detector volume with better analytical resolution. However, sources containing tritium have limited stability towards temperature and moisture and so are not appropriate to all potential applications. Nickel-63 sources are stable, but their analytical performance is inferior.

The present invention seeks to combine the two desiderata, namely low beta energy and high stability. According to the present invention there is provided an ionisation detector comprising a pair of electrodes defining between them a region for the passage of gas to be analysed and a source of iron-55 emitting electrons into the said region and thereby causing ionisation of gas in the said region.

Iron-55 decays with a half life of 2.7 years by electron capture, emitting X rays (25%) and Auger electrons (75%) which have energies calculated to lie between 5.387 and 5.640 keV, an energy band close to the mean energy of the tritium beta spectrum.

When the ionisation detector is an electron capture detector, it comprises an ionisation cell having entry and exit ports for gas, the pair of electrodes being positioned so that gas flowing through the cell passes through the region between them.

Electron capture detectors using nickel-63 as the ionisation source are described in U.S. Pat. No. 3,601,609, the disclosure of which is incorporated herein. As is stated therein, the cell and associated electrodes may be constructed according to Lovelock geometry (plane parallel electrodes) or cylindrical geometry (electrodes are the inner and outer facing surfaces of coaxial cylinders of different radius) or pin cup geometry. The low energy of the Auger electrons requires the radioactive source to be very thin, and this affects cell designs. It may be advantageous to provide the iron-55 source as a deposit on the cylindrical surface of a cylindrical cell, which surface is also one electrode, the other electrode being a wire or rod positioned axially within the cell.

Conventional electron capture detectors contain a radioactive source, for example of nickel-63 having a total beta activity of from 1 to 15 mCi. for example about 10 mCi. The iron-55 sources in detectors according to the present invention may have a total activity of from 1 to 15 mCi.

Because the maximum energy of the Auger electrons from iron-55 is only about 1/10 the maximum energy of the beta-particles from nickel-63, an iron-55 source will produce far fewer ion pairs, and hence a lower ion current, per mCi than the corresponding nickel-63 source. However, the sensitivity depends not only on the ion current but in addition on the signal-to-noise ratio, where the signal is the change in standing current, the latter being proportional to the number of ion pairs produced in the region between the electrodes per ionising emission by the source, and the noise is the fluctuation in this standing current and is associated with the statistical uncertainty of nuclear decay. Thus, optimum signal-to-noise ratio for a given standing current is favoured by using a source which emits a high flux of particles or rays (in order to minimise statistical uncertainty) with each particle or ray producing the minimum number of ion pairs (ideally only one pair) in the ionising region. Because the energy of the Auger electrons from iron-55 is only about one-tenth that of the beta particles from nickel-63, a lower level of noise is produced for a given standing current.

The lower energy of the emitted electrons means that the useful layer of iron-55 is very thin. High specific activity iron-55 may be electrodeposited on to a suitable substrate, for example, a wall of the ionisation cell or on to a foil or other conductor which is afterwards inserted into the cell. Nickel may be co-deposited with the iron to give a 20 to 30% alloy which resists corrosion. The electrodeposited layer may weigh of the order of $50 \mu g/cm^2$, to give an activity of 2 $mCi/cm^2$. A source of 4 mCi iron-55 of specific activity 30 Ci/g. gives a standing current of about 0.5 nanoamps in a typical detector. Unlike for example tritium sources, radioactive material is not lost by raising iron/nickel alloys to elevated temperatures. It should therefore be possible to use detectors according to this invention in conjunction with gas chromatography apparatus at temperatures higher than can be used with tritium detectors, for example above 225° C and as high as 300° C or even higher. It should be possible to use detectors according to this invention in applications or in situations where the loss of radioactive material, such as tritium, would be especially objectionable, for example use in confined locations.

The polarising potential applied between the electrodes should preferably be sufficient to collect all the free electrons. For electron capture detection, a potential of up to 150 volts is likely to be suitable. As in standard practice, such potential may be applied continuously or in pulse, for example one 8 microsecond pulse per 80 microseconds. Larger applied voltages, e.g. up to 300 volts, would be appropriate for cross-section detectors.

Just as the cell geometry of devices according to this invention can be varied widely, so can cell size. The distance between the two electrodes may suitably be from 0.5 mm to 20 mm, the upper end of this range (2–20 mm) being particularly appropriate for electron capture detectors and the lower end (0.5–5 mm) being particularly appropriate for cross-section detectors.

The present invention also includes a method of analysing the effluent from a gas chromatography apparatus, which method comprises passing the effluent gas, optionally at an elevated temperature, through the ionisation cell of a detector as hereinbefore defined, and operating the detector by a direct current polarising potential, by pulse or by a frequency modulated procedure so as to cause an ion current of from 0.05 to 10 nanoamps to flow between the electrodes in the cell, and measuring the ion current.

While the above description has related primarily to electron capture detectors, iron-55 Auger electron sources may also be used according to the invention in other types of ionisation detectors such as cross-section detectors, argon affinity detectors, electron mobility detectors, or combustion product detectors. The use of nickel-63 in combustion product detectors is described, for example, in British Patent Specification No. 1228800. For the reasons, and with the consequential modifications, noted above, nickel-63 sources may advantageously be replaced by iron-55 sources for such combustion product detectors. Such a replacement is expected to improve signal to noise ratio and thus reduce the risk of false alarms.

The accompanying drawing is a partly diagrammatical cross-section through a typical ionisation detector according to the invention, a detector which is entirely conventional except that the radioactive source is iron-55. The detector comprises a cylindrical chamber 10, 1.25 cm in diameter by 1.25 cm long having an axial entry port 12 and an exit port 14 for gas. The ends of the detector are of insulating material, for example, boron nitride; one end 16 includes the entry port 12; the other end 18 carries a rod 20, 1 mm in diameter, extending axially almost to the entry port 12, which rod 20 acts as an anode. The cylindrical side wall 22 acts as the cathode. Electrodeposited on the inner surface of the cathode 22 is a layer 24 of inactive nickel/iron-55 of such thickness that the total activity is 4 mCi.

A source of power 26 applies a continuous or intermittent potential difference across the anode 20 and the cathode 22 and a device A (28) records the operating ion current.

The performance of this instrument as an electron capture detector was compared to that of an instrument which was identical except that the 4 mCi inactive nickel/iron-55 layer had been replaced by a 0.5 mCi nickel-63 layer.

The conditions of measurement were 21° C at ambient pressure using nitrogen as carrier gas at a flow rate of 1 ml/sec. The detector was operated in pulse sampling mode. Two substances were analysed, Freon II (a fluorohydrocarbon) and carbon tetrachloride ($CCl_4$) each present in clean air at a concentration of 1 part in $10^{10}$. The results were as follows:

| Nuclide | Ni-63 | Fe-55 |
|---|---|---|
| Activity (mCi) | 0.5 | 4 |
| D.C. Saturation Current (Amps $\times 10^{-9}$) | 0.48 | 0.5 |
| Operating current (Amps $\times 10^{-9}$) | 0.34 | 0.3 |
| Noise (Amps $\times 10^{-12}$) | 0.4 | 0.1 |
| Signal (Freon II) (Amps $\times 10^{-12}$) | 10 | 6.4 |
| Signal ($CCl_4$) (Amps $\times 10^{-12}$) | 2.8 | 1.7 |
| Signal/noise Ratio (Freon II) | 25 | 64 |
| Signal/Noise Ratio ($CCl_4$) | 7 | 17 |

It can be seen that, for a given operating current, the signal to noise ratio, that is to say, the sensitivity, of the iron-55 detector is considerably the better of the two.

What we claim is:

1. An ionisation detector comprising a pair of electrodes defining between them a region for the passage of gas to be analysed and a source of iron-55 emitting electrons into the said region and thereby causing ionisation of gas in the said region.

2. An ionisation detector as claimed in claim 1 set up as an electron capture detector comprising an ionisation cell having entry and exit ports for gas, the pair of electrodes being positioned so that gas flowing through the cell passes through the region between them.

3. An ionisation detector as claimed in claim 2, wherein the iron-55 source is provided as a deposit on the cylindrical surface of a cylindrical cell, which surface is also one electrode, the other electrode being a wire or rod positioned axially within the cell.

4. An ionisation detector as claimed in claim 1, wherein the iron-55 source has a total activity of from 1-15 mCi.

5. A method of analysing the effluent from a gas chromatography apparatus, which method comprises passing the effluent gas through the ionisation cell of an electron capture detector having entry and exit ports for gas and a pair of electrodes defining between them a region for the passage of gas to be analysed, the pair of electrodes being positioned so that gas flowing through the cell passes through the region between them, and a source of iron-55 emitting electrons into the said region and thereby causing ionisation of gas in the said region, and operating the detector so as to cause an ion current of from 0.05 to 10 nanoamps to flow between the electrodes in the cell, and measuring the ion current.

* * * * *